United States Patent [19]

Sun et al.

[11] Patent Number: 5,546,776

[45] Date of Patent: Aug. 20, 1996

[54] PADLOCK AND LOCK HOLDER UNIT

[76] Inventors: Min-Hsiung Sun, No. 761, Sec. 2, Ta-Tung Rd.; Wang-Hsing Lin, No. 24, Alley 14, Lane 291, Yen-Cheng Rd., both of Tainan, Taiwan

[21] Appl. No.: 345,741

[22] Filed: Nov. 21, 1994

[51] Int. Cl.[6] .............................. E05B 67/22; E05B 45/00
[52] U.S. Cl. .......................... 70/233; 70/DIG. 49; 70/39; 70/439; 70/441; 248/289.11
[58] Field of Search .............................. 248/289.1, 289.3; 70/39, 233, DIG. 49, 38 A, 38 B, 38 C, 38 R, 52, 441, 439; 224/39

[56] References Cited

U.S. PATENT DOCUMENTS

| | | | |
|---|---|---|---|
| 3,237,899 | 3/1966 | Lewis | 224/39 R |
| 3,755,778 | 8/1973 | Kennedy et al. | 70/233 |
| 5,076,526 | 12/1991 | Zane et al. | 224/39 |
| 5,194,845 | 3/1993 | Sirmon et al. | 70/233 |
| 5,352,058 | 10/1994 | Munro et al. | 248/289.1 |
| 5,386,961 | 2/1995 | Lu | 224/39 |
| 5,404,735 | 4/1995 | Hsieh | 70/233 |
| 5,405,113 | 4/1995 | Jaw | 70/233 |
| 5,406,257 | 4/1995 | Saito | 20/DIG. 49 |
| 5,408,212 | 4/1995 | Meyers et al. | 70/233 |

FOREIGN PATENT DOCUMENTS

| | | | |
|---|---|---|---|
| 1007336 | 3/1977 | Canada | 70/DIG. 49 |
| 0413065 | 2/1991 | European Pat. Off. | 70/233 |
| 2239117 | 6/1991 | United Kingdom | 70/233 |

*Primary Examiner*—Darnell M. Boucher
*Attorney, Agent, or Firm*—Varndell Legal Group

[57] ABSTRACT

A padlock and lock holder unit including a padlock having a buzzer alarm circuit controlled by a pressed button to give an audio alarm signal when the padlock is attacked, and a lock holder consisting of a fixed clamping frame fixedly fastened to the bicycle frame, and a holder frame turned about a screw bolt on the fixed clamping frame and fixed in the desired angular position by a locknut for carrying the padlock when the padlock is not in use.

1 Claim, 7 Drawing Sheets

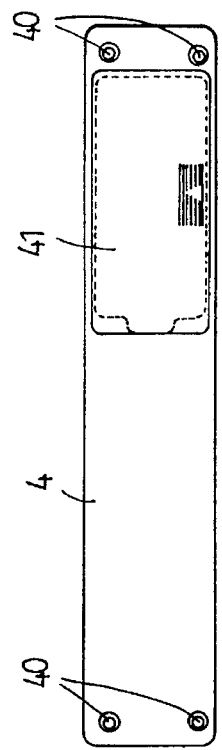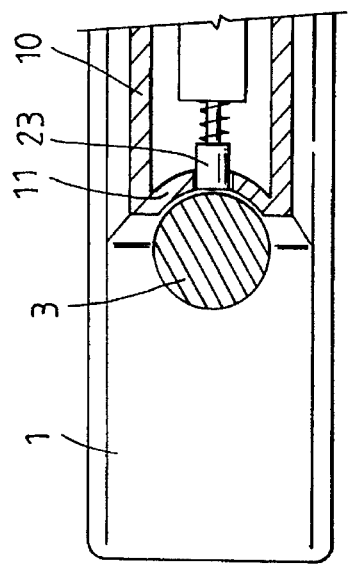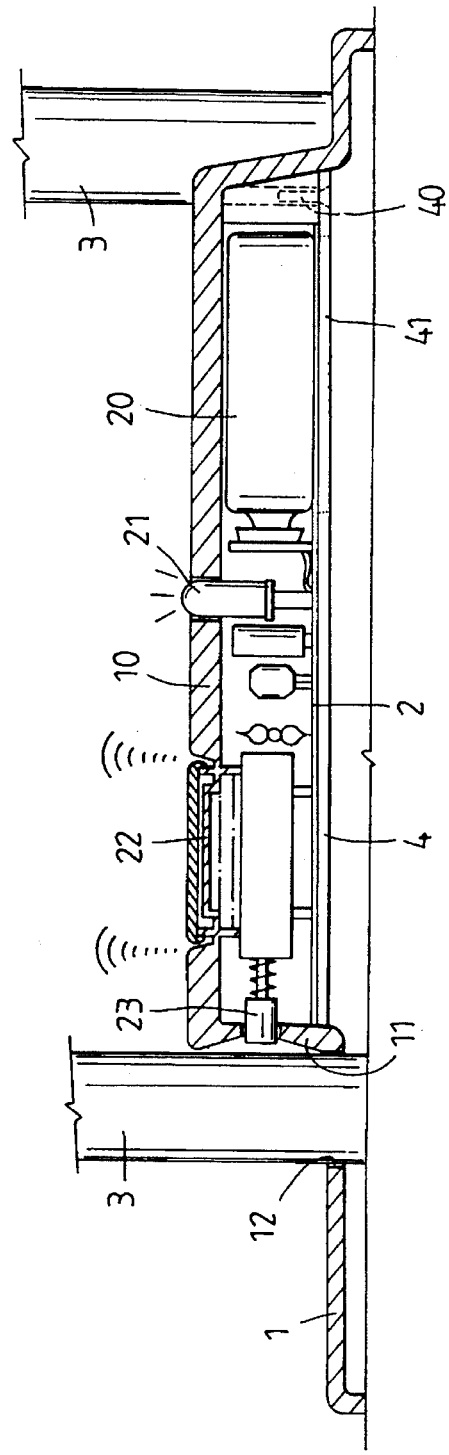
FIG. 6
FIG. 8
FIG. 7

5,546,776

PADLOCK AND LOCK HOLDER UNIT

BACKGROUND OF THE INVENTION

The present invention relates to a padlock and lock holder unit which includes a padlock having an audio alarm circuit, and a lock holder for carrying the padlock on the bicycle at any of a variety of angular positions.

A variety of padlocks are well known, and intensively used for locking bicycles and motorcycles. These padlocks commonly comprise a casing, a shackle connected to the casing, and a lock cylinder mounted within the casing and controlled to lock the shackle in the locking position. These padlocks are functional, however the shackle can be easily opened by a jack or a lever, and the lock cylinder can be easily removed from the casing by a hammer or the like.

Furthermore, a bicycle owner may fix a lock holder to the bicycle for carrying a padlock, which is to be used for locking the bicycle. As illustrated in FIGS. 11 and 12, the lock holder is generally fixed to the seat tube of the bicycle frame to hold the padlock in the space between the top tube and the down tube. However, when the padlock is carried on the lock holder, the space between the head tube and the down tube cannot be used for holding a basket ball or hanging a bicycle pump, bag, etc. For carrying the padlock on the seat tube between the head tube and the down tube will hinder a lady bicycle rider from riding the bicycle.

SUMMARY OF THE INVENTION

The present invention has been accomplished under the circumstances in view. According to one object of the present invention, the padlock comprises a circuit board having a buzzer controlled by a press button to give an audio alarm signal when the padlock is attacked. According to another aspect of the present invention, the press button is protected by the shackle of the padlock when the padlock is installed and locked. According to still another aspect of the present invention, the lock holder comprises a fixed clamping frame fixedly fastened to the bicycle frame by screws, and a movable holder frame hinged to the fixed clamping frame and adjustably fixed in the desired angular position by a locknut for carrying the padlock when the padlock is not in use.

BRIEF DESCRIPTION OF THE DRAWINGS

FIG. 6 is a sectional view taken along line B—B of FIG. 4;

FIG. 7 is a sectional view taken along line C—C of FIG. 5;

FIG. 8 is a bottom view of the circuit board supporting frame according to the present invention;

DETAILED DESCRIPTION OF THE PREFERRED EMBODIMENT

Figure 2:
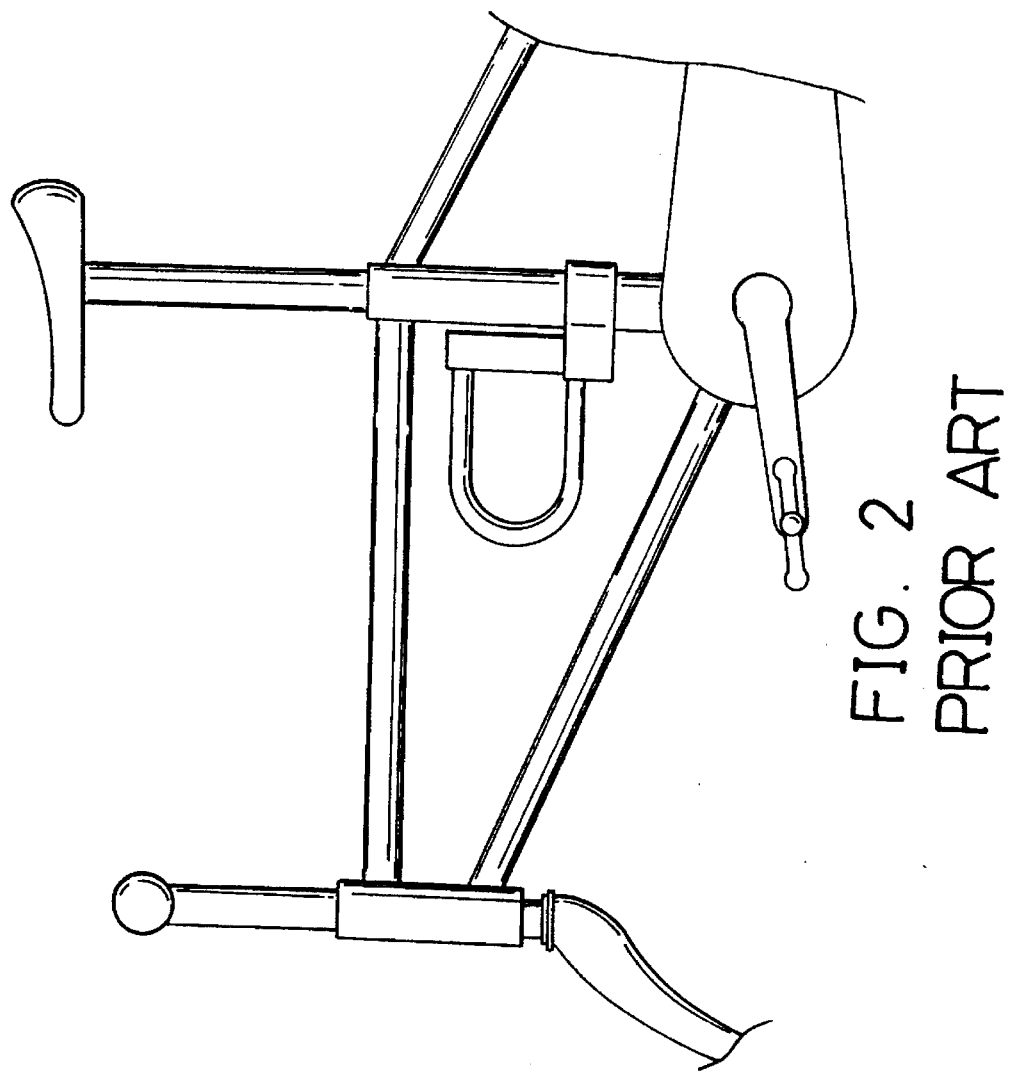
FIG. 2 shows the lock holder of FIG. 1 fixed to the seat tube of a bicycle to hold a padlock.
Figure 1:
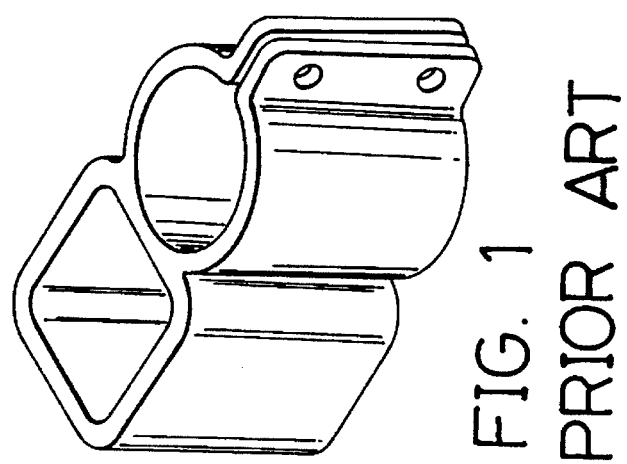
FIG. 1 is an elevational view of a lock bolder according to the prior art.
Figure 3:
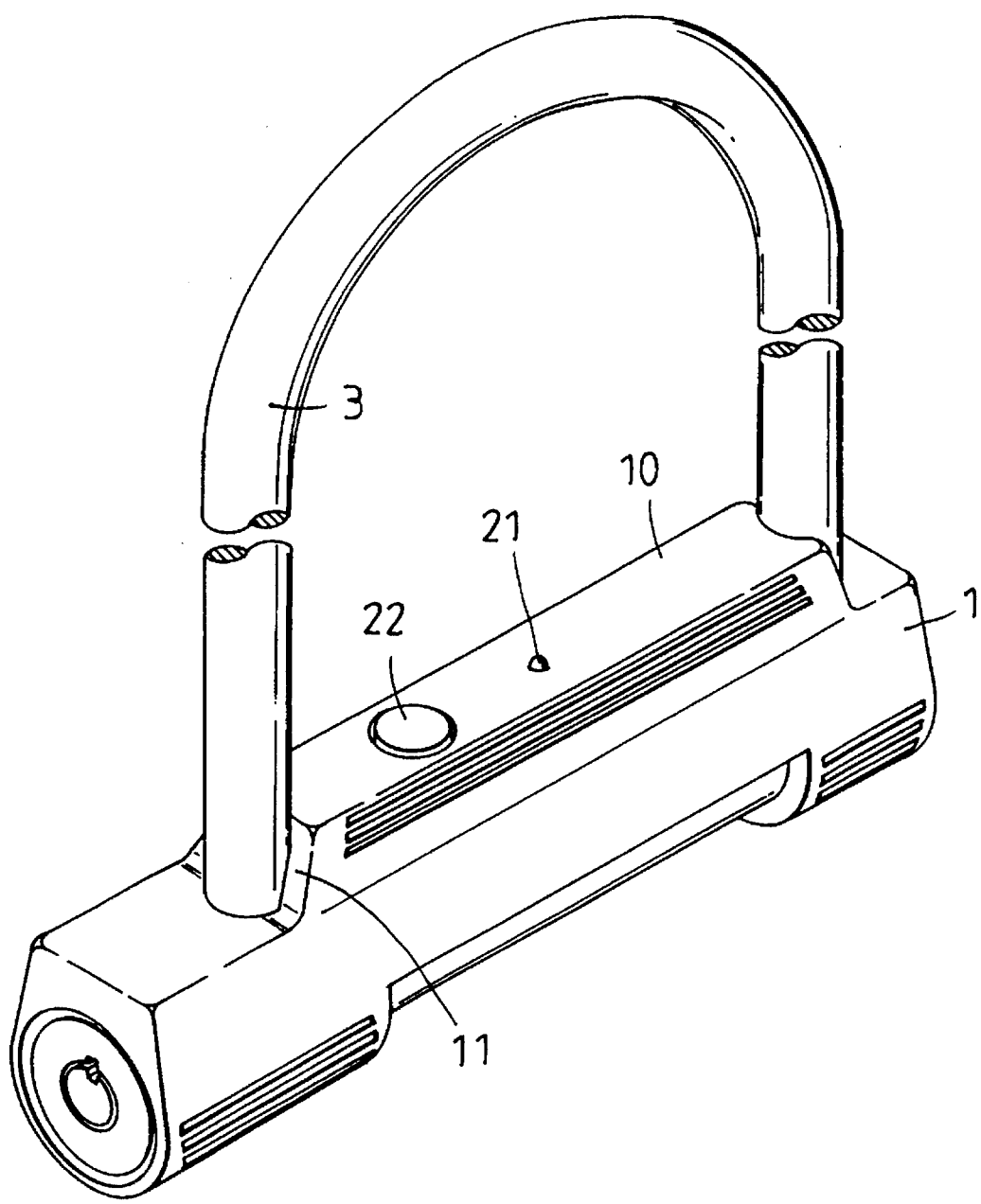
FIG. 3 is an elevational view of a padlock according to the present invention.
Figure 4:
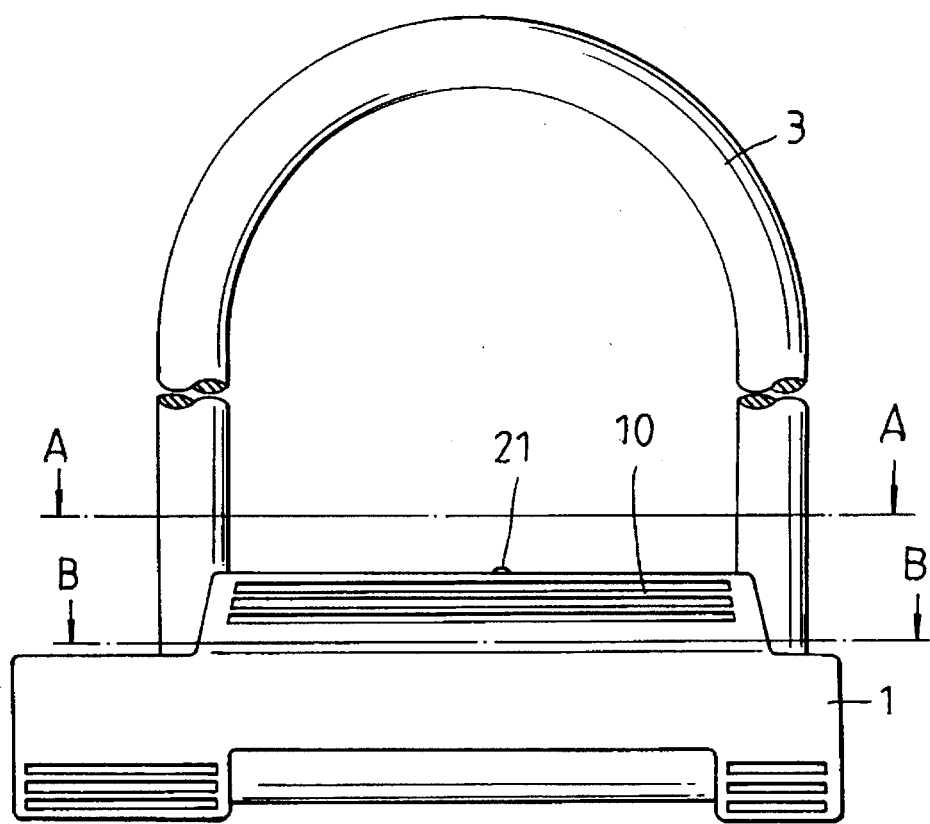
FIG. 4 is a front view of the padlock shown in FIG. 3.
Figure 5:
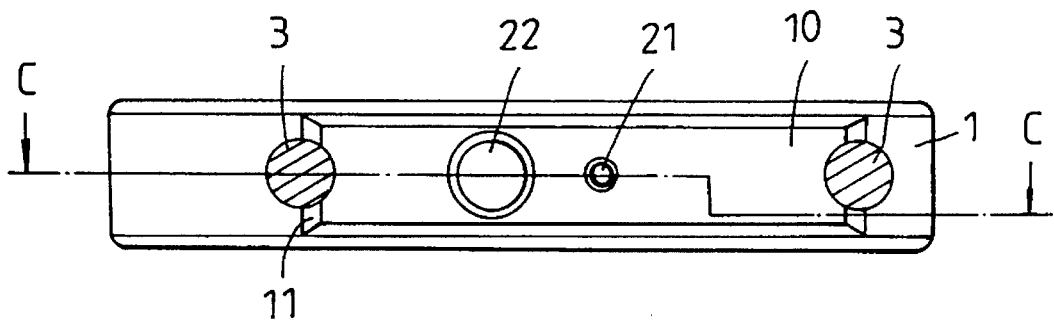
FIG. 5 is a sectional view taken along line A—A of FIG. 4.

Referring to FIGS. 3 through 8, a padlock and lock holder unit in accordance with the present invention is generally comprised of a padlock 1, and a lock holder. The padlock 1 comprises a casing 10, a shackle 3 fastened to the casing 10, and a circuit board 2 supported on a frame 4 installed inside the casing 10. The circuit board 2 comprises a battery 20, a LED (light emitting diode) 21, a buzzer 22, and a press button 23. The press button 23 extends out of a vertical wall 11 of the casing 10 adjacent to the shackle 3. The LED 21 and the buzzer 22 are disposed out of the top side of the casing 10. The frame 4 is fixedly fastened the casing 10 at the bottom by screws 40, having a sliding door 41 corresponding to the battery 20. When the sliding door 41 is opened, the battery 20 can be removed from the circuit board 2 for a replacement.

Figure 9:
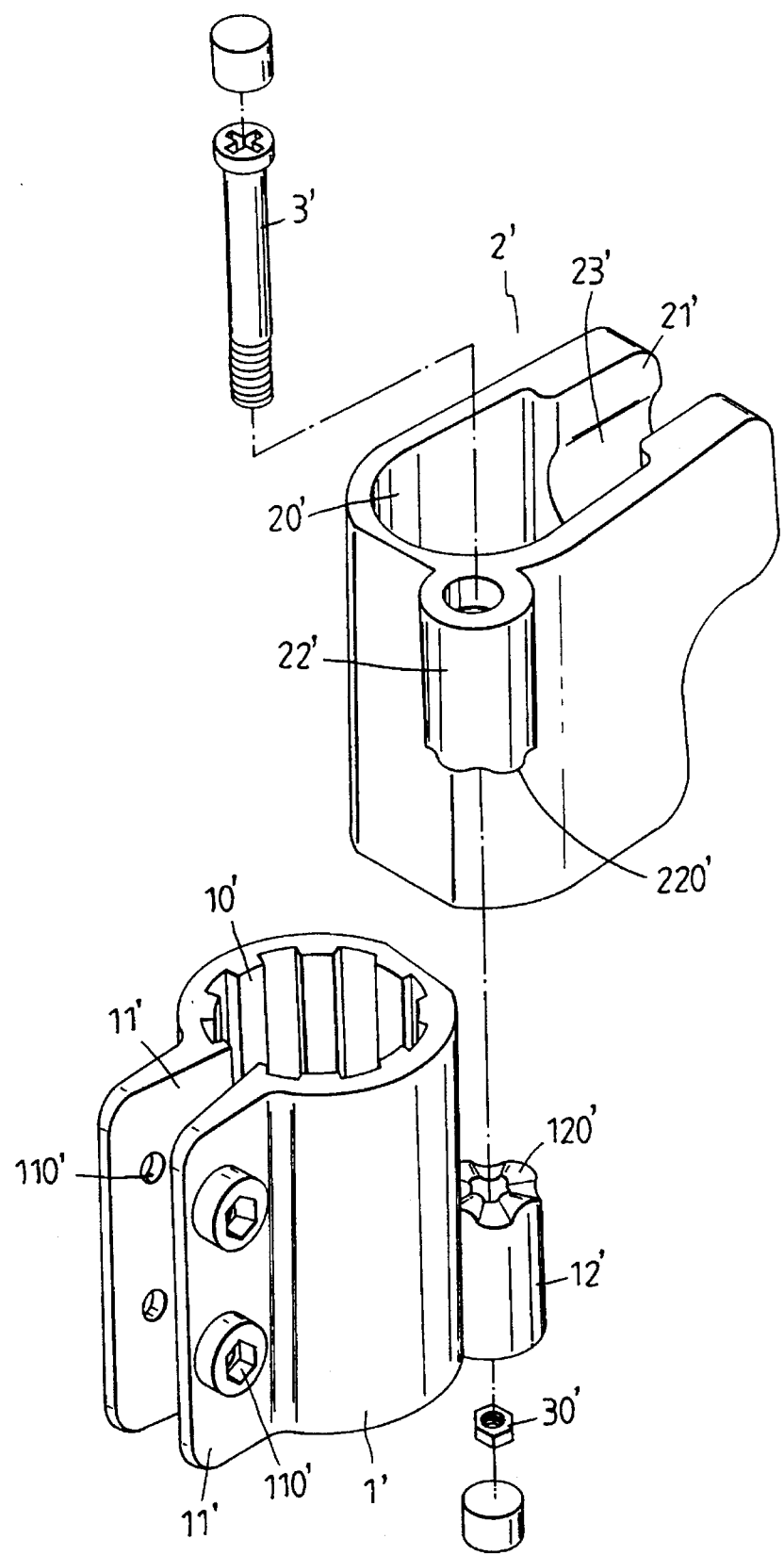
FIG. 9 is an exploded view of a lock holder according to the present invention.
Figure 10:
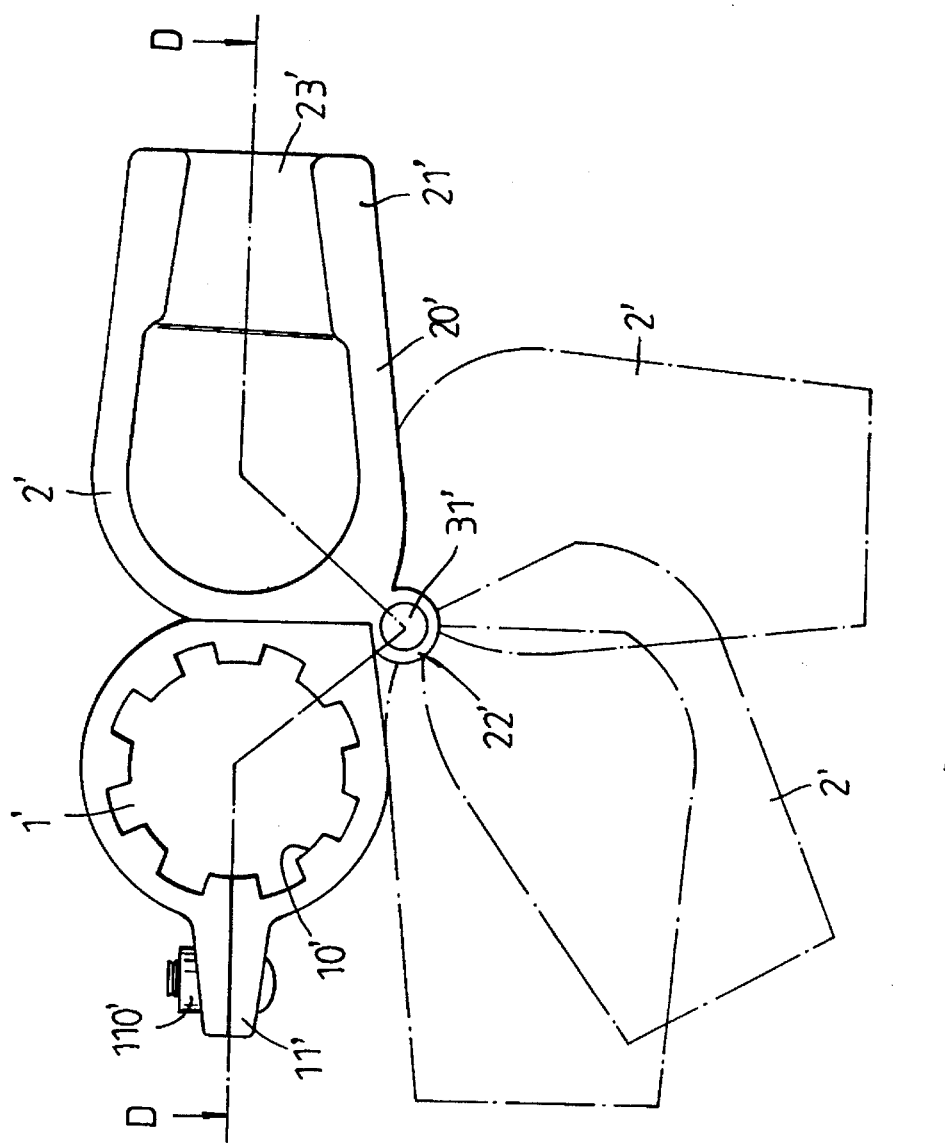
FIG. 10 shows the movable holder frame of the lock holder of FIG. 9 turned about the screw bolt on the fixed clamping frame thereof.
Figure 11:
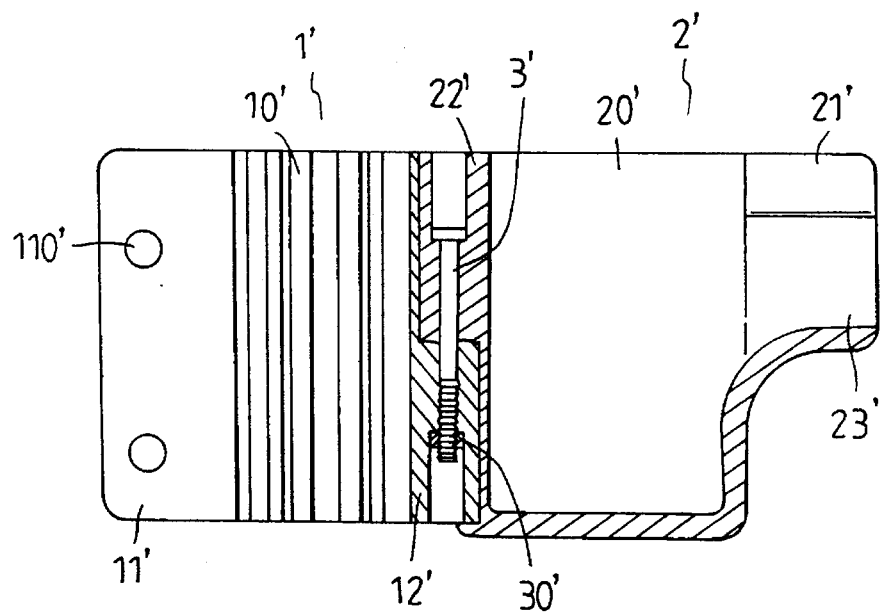
FIG. 11 is a sectional view taken along line D—D of FIG. 10.
Figure 12:
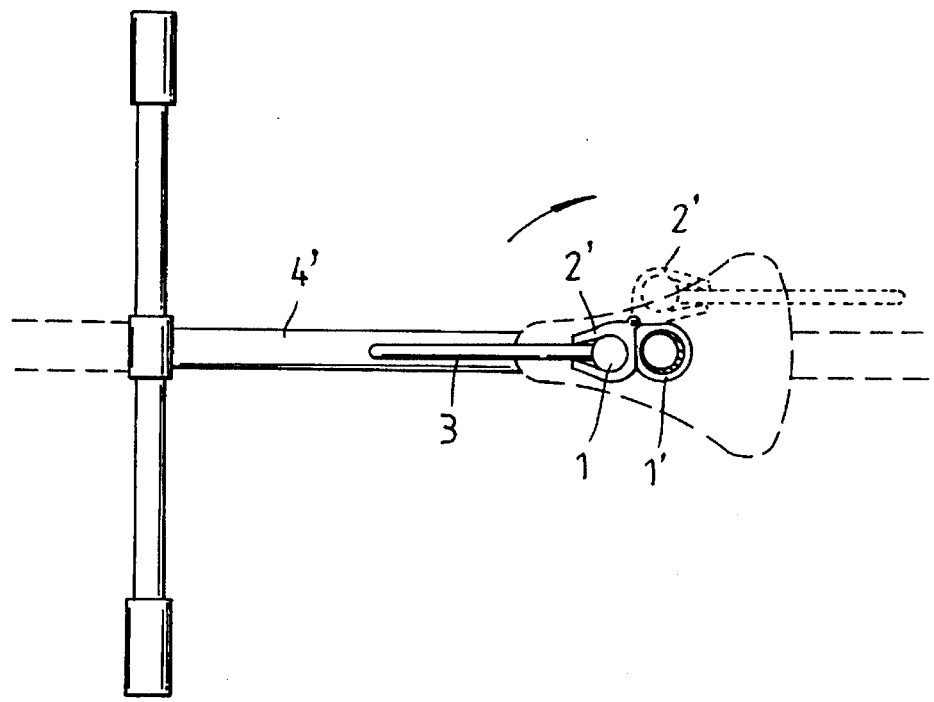
FIG. 12 is an installation example showing the the lock holder of the present invention installed in a bicycle frame.

Referring to FIGS. 9, 10, 11, and 12, the aforesaid lock holder is comprised of a fixed clamping frame 1', a movable holder frame 2', a screw bolt 3', and a locknut 30'. The fixed clamping frame 1' comprises a toothed clamping wall 10' mounted around the bicycle frame 4', two parallel tightening up walls 11' with screw holes 110' extended from two opposite ends of the toothed clamping wall 10', which are fastened together by screws when the toothed clamping wall 10' is mounted around the bicycle frame 4', and a barrel 12' longitudinally disposed atone side near the bottom end and having a corrugated top edge 120'. The movable holder frame 2' comprises a socket portion 20' and a shackle coupling portion 21'. The socket portion 20' comprises a barrel 22' longitudinally disposed at one side near the top and having a corrugated bottom edge 220'. The shackle coupling portion 21' defines an arched recess 23'. When the barrels 12' and 22' are longitudinally connected together with the corrugated top and bottom edges 120' and 220' engaged with each other, the screw bolt 3' is inserted through the barrels 12' and 22' and then screwed up with the locknut 30'. When the casing 10 of the padlock 1 is inserted into the socket portion 20', the shackle 3 is fitted into the arched recess 23', and therefore the padlock 1 is retained to the movable holder frame 2'. When the locknut 30' is loosened, the movable holder frame 2' can then be turned about the screw bolt 3' to adjust the angular position of the padlock 1 relative to the bicycle frame 4' (see FIG. 12).

When using the padlock 1, the shackle 3 is opened from the casing 10, then the press button 23 is pressed on to turn the circuit board 2 into the alarm mode. When the press button 23 is pressed on, the LED 21 will be turned on for 5 seconds. After the circuit board 2 has been set to the alarm mode, the shackle 3 is mounted around the object to be locked and then fastened to the shackle hole 12 on the casing 10. When the padlock 1 is attacked, the buzzer 22 will be triggered to give an audio alarm signal. To disarm the circuit board 2 is easy, and done by opening the shackle 3 and then pressing on the press button 22. About 10 seconds after the press button 22 has been pressed on, the circuit board 2 is disarmed.

We claim:

1. A padlock and lock holder unit comprising a padlock and a lock holder, said padlock including a casing; said casing having a base, a top having a shorter length than said base arranged on said base, said top having two side walls with concave surfaces; a shackle having two arms fastened into said bottom of said casing at said sides of said top of said casing where said concave surfaces have a curvature matching that of said arms of said shackle for closely receiving sides of said arms; said padlock further including a circuit board, a circuit board supporting frame fastened to said casing by screws for holding said circuit board inside said casing, said circuit board comprising a battery, a light emitting diode, a buzzer, and a press button extended out of one of said side walls of said top of said casing adjacent said shackle so that said press button cannot be pressed when said shackle is fastened into said casing, said light emitting diode and said buzzer being exposed through holes in said top of said casing, said circuit board supporting frame having a sliding door for accessing said battery; said circuit board being set to an alarm mode when said press button is depressed for turning on said light emitting diode for five seconds, and disarmed when said press button is depressed again for turning on said light emitting diode for about ten seconds; and said lock holder fixedly fastened to a vehicle for holding said padlock when said padlock is not in use, said lock holder comprising a fixed clamping frame, a movable holder frame, a screw bolt, and a locknut, said fixed clamping frame comprising a toothed clamping wall mounted around a vehicle frame, two parallel walls with screw holes extended from two opposite ends of said toothed clamping wall and fastened together by screws, and a barrel longitudinally disposed at one side and having a corrugated top edge, said corrugated top edge including a series of radially extending grooves and ridges, said movable holder frame comprising a socket portion for holding said casing of said padlock, and a shackle coupling portion for holding said shackle, said socket portion having a barrel longitudinally disposed at one side having a corrugated bottom edge, said corrugated bottom edge including a series of radially extending grooves and ridges meshed with said series of radially extending grooves and ridges of said corrugated top edge of said barrel of said fixed clamping frame, said barrel of said fixed clamping frame and said barrel of said movable holder frame being longitudinally connected together by said screw bolt and said locknut, said shackle coupling portion having an arched recess for holding said shackle, said movable holder frame rotatable about said screw bolt for changing an angular position of said padlock relative to said vehicle frame when said locknut is loosened from said screw bolt.

* * * * *